UNITED STATES PATENT OFFICE.

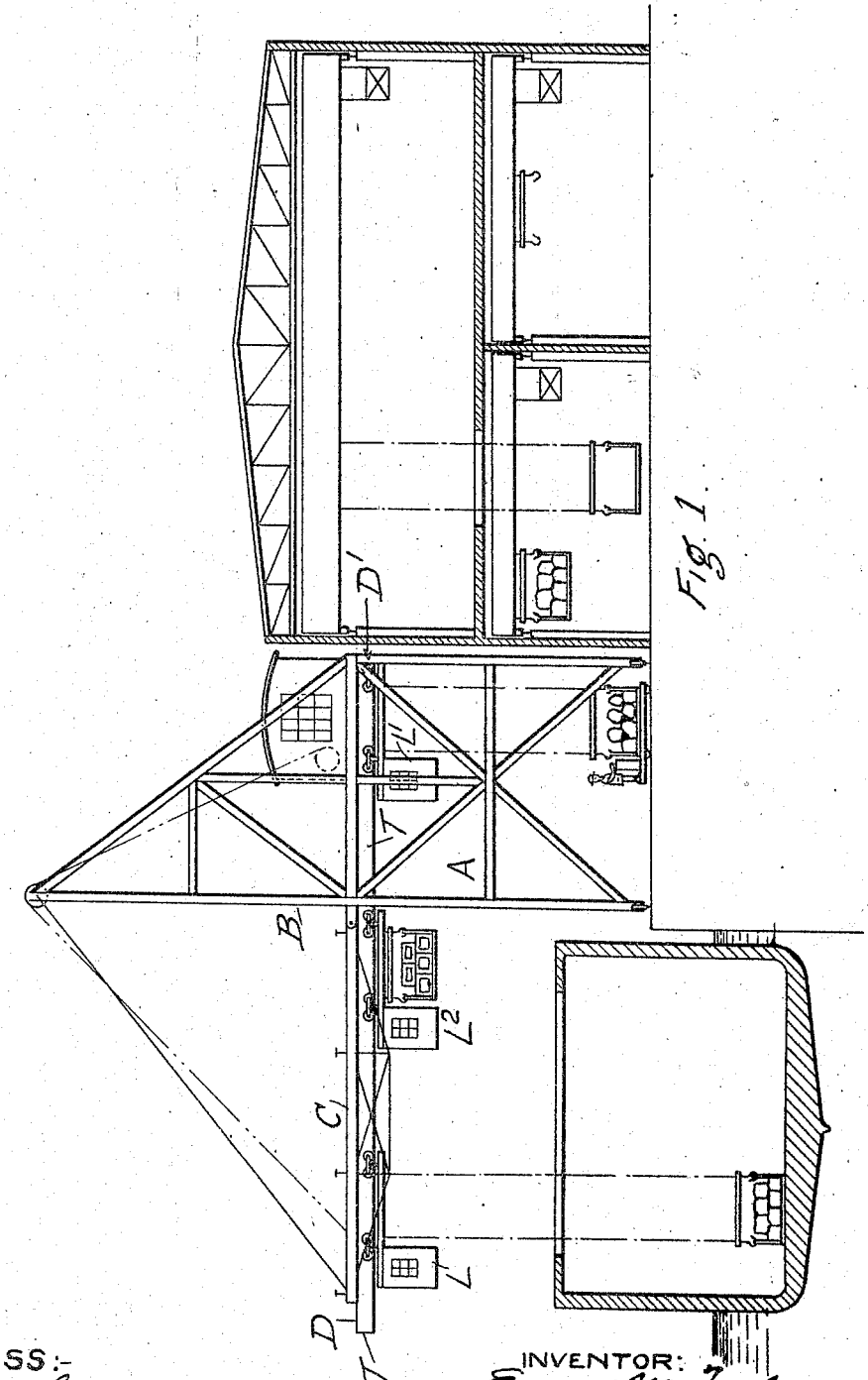

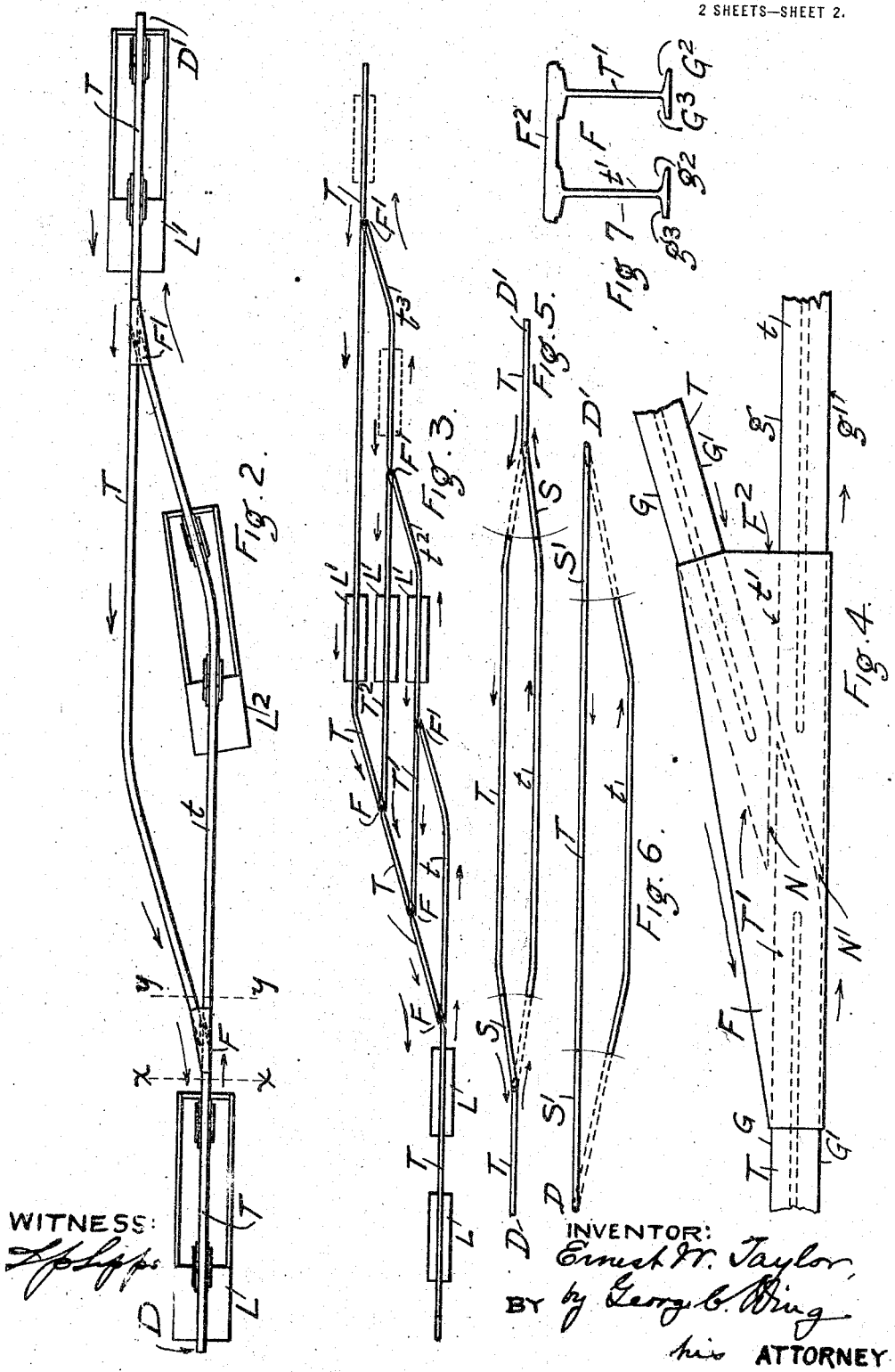

ERNEST W. TAYLOR, OF CLEVELAND, OHIO, ASSIGNOR TO THE BROWN HOISTING MACHINERY COMPANY, OF CLEVELAND, OHIO, A CORPORATION.

HOISTING AND CONVEYING MACHINE.

1,327,071.  Specification of Letters Patent.  Patented Jan. 6, 1920.

Application filed June 23, 1919. Serial No. 306,215.

*To all whom it may concern:*

Be it known that I, ERNEST W. TAYLOR, a citizen of the United States, residing at Cleveland, in the county of Cuyahoga and State of Ohio, have invented a new and useful Improvement in Hoisting and Conveying Machines, of which the following is a full, clear, and exact description, reference being had to the accompanying drawings, forming part of the specifications, wherein similar parts are designated by similar letters or numerals in each case.

The improvement in question relates more especially to the class of overhead monorail devices for picking up freight or other material and moving the same to or from storage or shipping points within the range of travel involved, and there depositing the packages, or loads, within cars, vessels, warehouses, or at other receiving points. Although, in a broad sense, the improvement is applicable to any telpher system of the monorail type, its utility will probably be more generally realized in apparatus where the outer terminal is upon an overhanging arm, or apron. In this latter class of apparatus, practical consideration must be given to the admissible weights, strains, and dimensions of the over-hanging arm, but, particularly, to the width of the hatches which the apparatus is to serve. These conditions are comparatively limited, and, for the most part to an extent that will not admit of track-duplication, on the arms or aprons, however desirable it otherwise might be, by such means, to speed up the loading or unloading capacity and process.

Taking into consideration these limitations, and understanding the importance of speed in the designed operation of existing devices of the kind referred to, I have conceived an arrangement, and alteration of these devices in the manner I shall now proceed to set forth.

In the several figures, Figure 1 is a side elevation of a special application of my idea, in connection with, and as a distinguishing feature of a portable hoisting and conveying machine, for use along docks, for loading or unloading vessels.

Fig. 2 represents an embodiment of the idea in a single turn-out system calculated to serve a plurality of working trolleys on one main trackway. Fig. 3 shows a combination—with a main trackway—of a group, or special assemblage of secondary trackways—into a multiple-unit whereby a plurality of trolleys is also workable upon the same machine without interference one with the other.

Fig. 4 is a diagrammatic plan of a frog adaptable to the I-beam trackways in the preceding figures; the lower flange of the I-beam is not in full view, but it precisely corresponds in cross dimensions with the top flanges of the main tracks and these are lettered accordingly.

Figs. 5 and 6 are forms of the improving feature where the necessary shunting of the trolleys is effected by specially arranged switches shown. Fig. 7 is an end view of the frog.

In the drawings A designates a unitary apparatus to which my idea is exceptionally adapted, and which its application signally improves.

It is a movable hoisting and conveying machine made up of a supporting structure B,—a vertically swinging arm or boom C, and a monorail overhead trackway T, extending centrally through both structure and arm. Inasmuch as a large use of this type of hoisting and conveying machine is for the unloading of vessels where demurrage is an important factor to be taken into account, there has been a consequent concentration of effort on the part of builders of these machines to attain designs and details which will insure a maximum of rapidity in their operation, or action. As hereinbefore observed, the usual width of a vessel's hatches precludes the use of a plurality of trolleys on independent and separate main trackways on the same arm or boom, above the vessels, inasmuch as, because of the narrow hatchways, but one of any parallelly-arranged tracks would lead its trolley to a point where it would spot the hatch. The problem of increasing the trolley-capacity of a machine of the kind in question, is therefore necessarily confined to a machine where a single main trackway only is used, and the obtaining of any enlargement of such a machine's trolley capacity, must be by a corresponding enlargement of the track-capacity behind and between the terminals, in such a manner that additional trolleys may be worked thereon, without interference, during the time, or intervals, when given portions of the arm track-ways would otherwise be free and unengaged. Of course, in the prevailing form of a single central track, but one trolley can be moved to and fro thereon, which, having hoisted its load to the arm, must then traverse the entire length of the runway to the lowering point. During this time, the track, as traversed, becomes open and idle and so remains until the trolley, after leaving its load, returns to the arm end of its route.

My improvement accordingly aims to provide the main track with one or more ancillary or side-tracks, whereby, as each trolley takes, or leaves its load, it may at once retrace its way back to the other terminus, without using the main monorail. By this arrangement, as will be obvious, the main track may be used for a plurality of loaded or empty trolleys only—as the case may be—in close succession, while trolleys, under opposite conditions as to loads, will occupy the siding. Under this mode of operation, there will be no idle movements for the several trackways, and, in consequence, the fullest capacity of the machine will be realized.

The arrangement referred to is brought about in various ways. The simplest form appears in Fig. 2, wherein T (extending the entire length of the drawing) is assumed to be the main monorail, and $t$ a secondary monorail siding to the same. It is also assumed that the two rails are reversely connected with each other, at or near the terminals of T by stationary switches, or frogs F and F', comprehended, in Fig. 4, by and within the full lines at such a point.

Referring, now, to Fig. 4, which may be regarded as a section of the tracks between the dotted lines $x$—$x$ and $y$—$y$ of Fig. 2, T and $t$, of course, are the main and secondary I-beam trackways, respectively, upon the flanges of which (corresponding approximately with the upper flnages G G' and $g$, $g'$) the flanged wheels of the trolleys L travel. Said lower flanges are similar to those shown in Fig. 7. These trackways are interrupted at each side of their proposed intersection, in order to admit therein a frog casting F, represented in full lines, in Fig. 4, to the underside of which I-beam track sections T' and $t'$, corresponding in cross and vertical dimensions with T and $t$, are a feature. The several track-sections of the casting are so disposed, beneath the plate $F^2$, that they will butt up against their respective tracks T and $t$, and serve as a continuation thereof, and, are of such lengths that they will leave a clearance space centrally of the junction of the main and secondary tracks T and $t$, for the passage of the trolley therethrough to or from one track to the other.

In order to guide the trolleys in such movements, and leave them free to follow their designed directions, flangeways, or channel-like apertures, N and N', are provided at said junction points, to admit the wheel flanges and any side parts of the trolley, and guide said flanges therethrough. These flangeways follow the direction of travel of the trolleys for which they are provided, the flange-way N, in the present instance, through and across said clearance space at the angle the main trackway takes, and the flange-way N', in direct alinement between the secondary track $t$, and the terminal D. As will be obvious a frog of this description would have to be reversely placed at the junction point of the main and secondary tracks at the opposite or D' end of the machine, and, further, that the switchless-frog F', which I show in the connection, is a preferable detail only, and that the essential idea involved is not dependent upon such an automatic crossing arrangement, at the several junction points, and any suitable switch or frog appliance may be used instead, without working a departure from the novel idea I claim herein.

Fig. 3 shows a manner of increasing the advantages of the lay-out illustrated in Fig. 2. As is manifest it consists in multiplying the number of secondary tracks, each in switch, or frog-connection with the main monorail T and, where necessary, with each other, thereby materially enlarging the track-room for trolleys on the way to the discharge end D. As in the simpler arrangement of Fig. 2, in that shown in Fig. 3, the only limit as to the number of trolleys that can be used, is the number which can be assembled, in close succession, upon the total trackage of the main monorail T, T' and $T^2$ and the several subordinate sidings $t$, $t'$ and $t^2$.

In said figure, it will be observed, that two trolleys in tandem are shown on the arm or boom, at the discharge end of the runway. While the width of hatches is not sufficient to permit the simultaneous lowering into the same of buckets or crates, side by side, as would be the normal mode of operating when independent tracks are used on the same area, their longitudinal dimension is such—as a glance at Fig. 1 will make clear—that there is room to discharge more than one load at the same time in a machine containing my improvement, by bringing two or more in close succession upon the single track of the arm C.

The trolleys L, when in this relative position above the hatch, can discharge their loads simultaneously, with little, or no hindrance to either and thereafter at once return, through a secondary track, or tracks, to the loading end D'.

The necessary switching from one track to another, instead of being unobstructed and free, as in the arrangement already described, may be under special controls, either manual, electrical or mechanical.

Figs. 5 and 6 indicate one form of a controllable switching plan, and location, of this nature, where short sections S and S' respectively of the monorail T, at or near the terminals, are adapted to be moved radially from their places in the main trackway into line with and to butt up against the end of a branch or secondary track, to thereby bridge the gap between said tracks, and provide a continuous route, or path for the emptied trolley toward the loading end D'. In Fig. 5 the pivotal point for the movable section S, is located at such distance, on the trackway T, from the point of actual discharge, that the loaded trolley will have traversed the section and be on the fixed track beyond, when the switch section S is moved, into line with the secondary track $t$. In Fig. 6, the pivotal point is located at the limit of travel on the arm C.

Fig. 7 shows an end view of the casting F, $G^2$ $G^3$ and $g^2$ $g^3$, being the lower flanges on which the trolley wheels move.

The designed manner of utilizing said improvement will appear by referring to Fig. 2 wherein L represents a loaded trolley at the place of discharge on the boom end, and L' a trolley at the opposite end of the runway in the process of being loaded, and $L^2$ an emptied trolley, on the branch track $t$, awaiting the loading of the trolley L' and its departure from the station D'. As soon as L' is loaded it will proceed, in the direction of the arrow, along the main trackway T to the junction at F, to be in place to move to the position for discharge beyond, as soon as that position is vacated by the trolley L. This will occur when L, being discharged, travels backward, on its way toward D'. At the switch or frog F, said trolley L will be diverted to the secondary trackway $t$, where it will take the place before occupied by $L^2$, which, in the meantime, has completed the operating cycle by moving to the loading point at D'.

It is to be noted that although I have shown, and specifically described an arrangement which calls for flanged wheels upon the trolleys to be used, and which, perhaps, implies trucks on such forms of carriers where the wheels travel on both sides of an I-beam, I do not intend to thereby limit my improvement, in the broad sense, to such elements. In such sense it extends and is equally applicable to any form of monorail, trolley, wheels or switches, (whether the latter are referred to as frogs, or otherwise) employed, and, as generally claimed, whatever are the means used for controlling such switches.

Having thus defined my said invention and shown and described a complete embodiment of the same, what I claim, and wish to protect by Letters Patent, is:—

1. In a hoisting and conveying machine, the combination of an overhead I-beam main trackway, a branch trackway therefrom intermediate of the terminals of the main trackway, and trolleys provided with flanged wheels arranged to travel on said trackways, and to hoist, carry and lower loads, the said trackways being interrupted at their junction points for the passage of the trolleys therethrough, and provided in the open space, so formed, with suitable flange-ways to receive and guide the flanges of the trolley-wheels during, and for, their said passage, on and to, the main trackway when the trolleys are traveling in one direction, and on and to the branch trackway, when traveling in the opposite direction, substantially as shown and described.

2. In a hoisting and conveying machine, the combination of an overhead main trackway for the travel of trolleys, a plurality of trolleys arranged to travel thereon, and to hoist, carry and lower loads, and, a series of correlated branch trackways, intermediate of the main trackway, each member of the series being connected at one end with the main trackway, and at their other ends, in succession, with the branch members, and the main trackway, together with suitable frog-like switches, at the several junction points, to permit the trolleys to travel continuously over the main trackway, from one terminal to the other, in one direction, and over said series in the other, substantially as shown and described.

3. As a unitary device for hoisting and conveying freight and like material, the combination of a supporting structure having a vertically swinging boom or arm pivoted thereto, a main overhead trackway on said structure, and boom or arm, a secondary, or branch, trackway with terminals at points on the main trackway intermediate of the terminals of the main trackway, a plurality of trolleys arranged to traverse said trackways, and suitable means for diverting said trolleys from the main to the secondary trackway at one end of the secondary trackway, and from the secondary to the main trackway at the other end, substantially as shown and described.

ERNEST W. TAYLOR.

In presence of:—
  L. P. Lipps,
  J. P. Dowd.